(12) United States Patent
Muraoka et al.

(10) Patent No.: US 7,165,761 B2
(45) Date of Patent: Jan. 23, 2007

(54) FLUID FILLED ACTIVE VIBRATION DAMPING DEVICE

(75) Inventors: Mutsumi Muraoka, Kasugai (JP); Atsushi Muramatsu, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 11/220,577

(22) Filed: Sep. 8, 2005

(65) Prior Publication Data

US 2006/0055095 A1 Mar. 16, 2006

(30) Foreign Application Priority Data

Sep. 10, 2004 (JP) .............................. 2004-264308

(51) Int. Cl.
*F16F 5/00* (2006.01)
(52) U.S. Cl. ................................. 267/140.14
(58) Field of Classification Search ..............................
267/140.13–140.14
See application file for complete search history.

(56) References Cited

U.S. PATENT DOCUMENTS

| 4,793,599 | A | * | 12/1988 | Ishioka | 267/140.14 |
|---|---|---|---|---|---|
| 5,967,269 | A | * | 10/1999 | Kato | 188/380 |
| 6,189,873 | B1 | * | 2/2001 | Aoki | 267/140.14 |
| 6,276,673 | B1 | * | 8/2001 | Hibi et al. | 267/140.14 |
| 6,305,675 | B1 | * | 10/2001 | Muramatsu | 267/140.14 |
| 6,315,277 | B1 | * | 11/2001 | Nagasawa | 267/140.14 |
| 6,325,364 | B1 | * | 12/2001 | Muramatsu | 267/140.14 |
| 6,364,294 | B1 | * | 4/2002 | Gennesseaux et al. | 267/140.13 |
| 6,406,010 | B1 | * | 6/2002 | Yano et al. | 267/140.14 |
| 6,527,262 | B2 | * | 3/2003 | Hagino et al. | 267/140.14 |
| 6,565,072 | B2 | * | 5/2003 | Goto et al. | 267/140.14 |
| 6,588,737 | B2 | * | 7/2003 | Goto et al. | 267/140.14 |
| 6,641,120 | B2 | * | 11/2003 | Nemoto | 267/140.14 |
| 2005/0275145 | A1 | * | 12/2005 | Muraoka et al. | 267/140.14 |

FOREIGN PATENT DOCUMENTS

| JP | A 08-80751 | 3/1996 |
|---|---|---|
| JP | A 2000-227137 | 8/2000 |
| JP | A 2002-118677 | 7/2002 |
| JP | A 2003-339145 | 11/2003 |

* cited by examiner

*Primary Examiner*—Christopher P. Schwartz
(74) *Attorney, Agent, or Firm*—Oliff & Berridge, PLC (57) ABSTRACT

A fluid filled active vibration damping device wherein a first and a second mounting member are coupled by a rubber elastic body, thereby forming a pressure receiving chamber defined at one part by the rubber elastic body, with a non-compressible fluid sealed therein, and at another part by an excitation plate capable of displacement. An electromagnetic actuating assembly are disposed on the pressure receiving chamber side with the excitation plate therebetween. The excitation plate is oscillated by application of electronical current to a coil member in the electromagnetic actuating assembly. The output member projects out towards the excitation plate from the electromagnetic actuating assembly, and a permanent magnet is disposed in the output member and/or the excitation plate in order to couple the output member and the excitation plate through magnetic force.

6 Claims, 5 Drawing Sheets

FLUID FILLED ACTIVE VIBRATION DAMPING DEVICE

INCORPORATED BY REFERENCE

The disclosure of Japanese Patent Application No. 2004-264308 filed on Sep. 10, 2004 including the specification, drawings and abstract is incorporated herein by reference in its entirety.

BACKGROUND OF THE INVENTION

1. Field of the Invention

The present invention relates in general to an active vibration damping device for use in an automotive engine mount, body mount, or vibration suppression device, to provide active or offsetting damping action. More particularly, the present invention is concerned with a fluid filled active vibration damping device wherein a portion of the wall of a pressure receiving chamber with a non-compressible fluid sealed therein is constituted by an excitation plate, with the excitation plate being actuated by electromagnetic actuating assembly in order to control the pressure in the pressure receiving chamber, which forms the basis for the aforementioned damping action.

2. Description of the Related Art

A fluid filled active vibration damping device are known as one kind of vibration damping coupling or mount to be installed between components that are desired to be damped, such as an automotive engine mount or body mount, to provide vibration damped coupling between the components. A damping apparatus of this kind typically has a construction wherein a first mounting member and a second mounting member connected to one another by a rubber elastic body are respectively attached to the components to be coupled in vibration damping fashion, and comprising a pressure receiving chamber a portion of whose wall is constituted by the rubber elastic body, and having a non-compressible fluid sealed therein. An excitation plate constitutes another portion of the wall of the pressure receiving chamber, with pressure control of the pressure receiving chamber being carried out by means of excitation of the excitation plate by the actuating assembly. With this arrangement, for example, components coupled in vibration damping fashion are subjected to excitation corresponding to vibration to be damped, on the basis of which the vibration may be offset; or the spring characteristics of the mounting may be modified depending on input of vibration to be damped, to produce low spring or the like, in order to provide active damping action of the vibration.

In order to effectively achieve damping action with a fluid filled active vibration damping device of this kind, a high-level of control accuracy and responsiveness are required during pressure control of the pressure receiving chamber. For this reason, it is preferable to use electromagnetic actuating assembly, such as a voice coil type or electromagnet type employing a coil, as taught in JP-A-8-80751, JP-A-2000-227137, and JP-A-2002-188677.

For reasons relating to manufacture, in most cases, the electromagnetic actuating assembly is fabricated as a separate part from the rubber elastic body and the vibration damping device proper comprising the pressure receiving chamber and excitation plate, and installed in the vibration damping device with the output member of the actuating assembly coupled to the excitation plate.

In the fluid filled active vibration damping device of conventional construction as taught in the above described documents, when coupling the output member of the actuating assembly with the excitation plate, the output member and the excitation plate are bolted together; or the output member is secured press-fit into a cylindrical portion projecting from the excitation plate; or the output portion is positioned on a caulking portion provided to the excitation plate, and subjected to caulking. A resultant problem is that the coupling operation was both laborious and time consuming.

In the active vibration damping device of this kind, due to differences in dimension of components and sites pertaining to coupling of the output portion and the excitation plate, and to error (deviation) of mounting location of the electromagnetic actuating assembly on the vibration damping device proper, there is a risk that the center axis of the excitation plate and the center axis of the output member will be misaligned. If the components are forcibly coupled with their axes misaligned with one another, in addition to the risk of possible damage to the excitation plate, there is also the problem of the center axis of the excitation plate and the center axis of the output member becoming inclined relative to the vertical. Due to the fact that actuated displacement of the excitation plate is not realized efficiently, this makes it difficult to achieve the desired excitation force, and thus an inherent problem is that the desired damping action may not be achieved consistently.

Where it is attempted to establish a high degree of dimensional accuracy of components pertaining to coupling of the output portion and the excitation plate in order to address such problems, production and management become extremely difficult.

SUMMARY OF THE INVENTION

It is therefore one object of this invention to provide a fluid filled active vibration damping device of novel construction permitting a readily connection between an excitation plate and an output member of an actuating assembly, thereby improving production efficiency of the device dramatically.

The invention according to a forth mode of the invention, which will be described later, provides a fluid filled active vibration damping device of novel construction whereby the dimensions of the excitation plate and the attachment location of the actuating assembly can be established without an excessive degree of exactitude, thus facilitating production and management; and whereby the excitation plate may undergo actuated displacement consistently so that the desired damping action is produced consistently.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

According to a first mode of the invention provides a fluid filled active vibration damping device comprising: a first mounting member; a second mounting member; a rubber elastic body elastically connecting the first and second mounting member; a pressure receiving chamber having a non-compressible fluid sealed therein and undergoing input of vibration, the pressure receiving chamber being defined at one part by the rubber elastic body, and at another part by an excitation plate capable of displacement; and an electromagnetic actuating assembly is disposed on an opposite side from the pressure receiving chamber with the excitation plate therebetween, wherein the excitation plate is subjected to actuating force of an output member actuated by application of electronical current to a coil member in the electromagnetic actuating assembly, thereby exciting the excitation plate in order to control a pressure in the pressure receiving chamber, and wherein the output member projects out towards the excitation plate from the electromagnetic actuating assembly, and a permanent magnet is disposed in at least one of the output member and the excitation plate in order to couple the output member and the excitation plate through magnetic force.

In the fluid filled active vibration damping device of construction according to this mode, the output member and the excitation plate are coupled utilizing the magnetic force of a permanent magnet, whereby there is advantageously achieved a coupling operation that is simpler than conventional operations such as bolting, pressure member, or caulking.

The electromagnetic actuating assembly of the mode may consist of any means or devices that affords controlled excitation of the excitation plate at the desired frequency. For example, there could be employed a solenoid type actuating assembly wherein an output member serving as an armature is disposed in the center hole of a solenoid comprising a coil member, and the output member actuated in the axial direction through the action of electromagnetic force or magnetic force when current is passed through the coil member; an electromagnetic type actuating assembly wherein an output member is actuated by magnetic force created between permanent magnets or ferromagnetic members by means of current is passed through a coil member; or a voice coil type actuating assembly wherein a coil member is disposed between the magnetic pole faces of permanent magnets positioned facing one another across a gap, and electromagnetic force produced by passing current through the coil member is utilized to actuate an output member in the axial direction. Actuating force produced by electromagnetic force or magnetic force need not necessarily be made to act alternately on both axial sides of the output member, it being possible as well to employ electromagnetic actuating assembly wherein actuating force to one side in the axial direction is produced by passing current through a coil member, with return to the other side in the axial direction being accomplished with a spring member or the like.

A second mode of the invention provides a fluid filled active vibration damping device according to the aforementioned first mode, wherein the permanent magnet is disposed on one of the output member and the excitation plate, and a magnetic member comprising ferromagnetic material is disposed on an other of the output member and the excitation plate, while the output member and the excitation plate are coupled by means of superimposing a magnetic pole produced by the permanent magnet, against the ferromagnetic material.

In this mode, the output member and the excitation plate are coupled by only disposing a permanent magnet on either the output member or the excitation plate, whereby the advantages of simple construction and lower cost may be achieved as well.

A third mode of the invention provides a fluid type active vibration damping device according to the aforementioned first or second mode, wherein the output member and the excitation plate have faces superimposed against each other and coupled utilizing magnetic force, each face being designed as a flat surface extending orthogonal to a direction of displacement of the output member.

In this mode, by constituting the coupling faces of the excitation plate and the output member as flat surfaces, even if a certain amount of axial misalignment between the excitation plate and the output member should occur, the excitation plate and the output member can nevertheless be coupled stably despite such axial misalignment.

A fourth mode of the invention provides a fluid filled active vibration damping device according to the aforementioned third mode, wherein one of the flat surface of the output member or the flat surface of the excitation plate is constituted as a magnetic pole face at which is positioned a magnetic pole produced by the permanent magnet; and an other one of the flat surface of the output member and the flat surface of the excitation plate side is constituted as a magnetic force acting face composed of ferromagnetic material, the magnetic force acting face having a larger flat shape than the magnetic pole face.

Differences in dimension of components pertaining to coupling of the excitation plate and the output portion, or error of the mounting location of the actuating assembly may cause a risk that the center axis of the excitation plate and the center axis of the output member will be eccentric is the axis-perpendicular direction or inclined with respect to the displacement axis of the output member. In this mode, however, a magnetic pole face on the magnetic path produced by a permanent magnet is superimposed against a suitable location of the magnetic force acting face of a ferromagnetic member, whereby the excitation plate and the output member can be coupled stably, even under conditions where the center axis of the excitation plate and the center axis of the output member are not on the same axis. Thus, according to the damping apparatus of this mode, even in the case of relative axial deviation between the excitation plate and the output member, the two can be coupled securely while preventing inclination of the center axes of the members, so that displacement of the output member is transmitted efficiently to the excitation plate. Thus, the desired vibration damping action can be achieved on the basis of consistent achievement of the intended excitation force.

In the damping apparatus of this mode, on the basis of the action described above, there is large permissible error when positioning the center axis of the excitation plate and the center axis of the output member relative to the output member. Easy production and management are afforded thereby.

A fifth mode of the invention provides a fluid type active vibration damping device according to any of the aforementioned first through fourth modes, wherein a yoke member is disposed around the permanent magnet, and both of the two magnetic poles of the permanent magnet are positioned at faces of the output member and the excitation plate superimposed together.

In this mode, a higher level of magnetic force is obtained on the basis of reduced flux leakage of the permanent magnet, whereby the excitation plate and the output member are coupled more advantageously, and whereby the permanent magnet can be made smaller. By so doing, lighter weight can be achieved in the coupling zones of the excitation plate and the output member, producing improved actuation response and affording a higher degree of controllability.

A sixth mode of the invention provides a fluid type active vibration damping device according to any of the aforementioned first through fifth modes, further comprising: a variable volume equilibrium chamber partially defined by a flexible film and having the non-compressible fluid sealed therein; and an orifice passage formed to connect the equilibrium chamber to the pressure receiving chamber.

In this mode, when vibration is input to the pressure receiving chamber, passive vibration damping action is advantageously achieved, on the basis of flow action, e.g. resonance, of fluid flowing through the orifice on the basis of a pressure difference created between the pressure receiving chamber and the equilibrium chamber.

A seventh mode of the invention provides a fluid filled active vibration damping device according to the aforementioned sixth mode, wherein the flexible film is fastened fluid tightly at an outer peripheral edge portion thereof to the second mounting member; and a coupling portion is disposed perforating fluid tightly through a center portion of the flexible film from the excitation plate and projecting towards the output member of the electromagnetic actuating assembly, and coupled with the output member.

In this mode, by having a coupling portion that projects out from the excitation plate towards the output member perforate the flexible film fluid tightly, the excitation plate and the output member are easily coupled to the outside of the fluid chambers, while assuring adequate fluid tightness on the part of the pressure receiving chamber and other fluid chambers situated to the inside of the second mounting member.

In this mode, the center portion of the flexible film which constitutes part of the wall of the equilibrium chamber according to the sixth mode, and the excitation plate which constitutes part of the wall of the pressure receiving chamber, are fastened to one another. Accordingly, when vibration is input across the first mounting member and the second mounting member, by means of adjusting the actuation displacement of the excitation plate in response to the vibration, pressure fluctuation may be advantageously produced between the pressure receiving chamber and the equilibrium chamber, whereby vibration damping action on the basis of flow action, e.g. resonance, of fluid induced to flow through the orifice may be more advantageously achieved.

As will be apparent from the preceding description, in the fluid filled active vibration damping apparatus constructed according to the invention, the excitation plate and the output member are coupled using magnetic force, making the operation simpler than conventional operations such as bolting, pressure member, or caulking, so that production efficiency may be improved appreciably.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
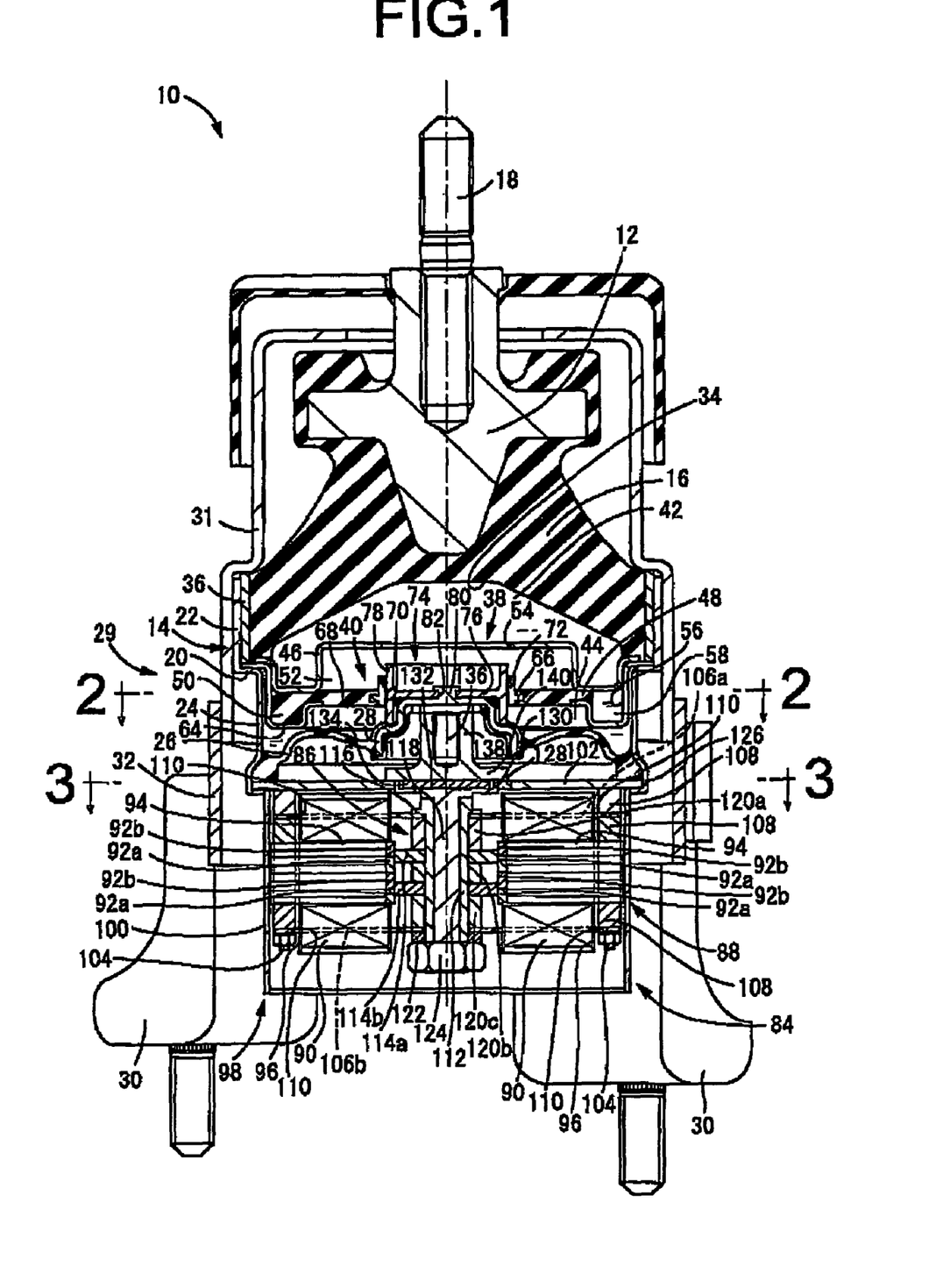
FIG. 1 is an elevational view in axial or vertical cross section of a fluid filled vibration damping device in the form of an engine mount for use in an automotive vehicle, which is constructed according to a first embodiment of the invention.

A more detailed understanding of the invention is provided by the following description of the embodiments of the invention. Referring first to FIG. 1, there is shown an automotive engine mount 10 by way of a first embodiment of the invention. This engine mount 10 has a construction wherein a metallic first mounting member 12, and a metallic second mounting member 14, spaced apart from one another by a specific distance are elastically coupled by means of a rubber elastic body 16 disposed therebetween. By attaching the first mounting member 12 and the second mounting member 14 to the vehicle body side and to the power unit side, the engine mount 10 is designed to support the power unit on the body in a vibration damping fashion. When installed in an automobile, elastic deformation of the rubber elastic body 16 due to the weight of the power unit causes the first mounting member 12 and the second mounting member 14 to undergo relative displacement by a certain amount in the direction bringing them closer together; and the main vibration intended to be damped is input in the generally vertical direction in FIG. 1. In the description hereinbelow, unless otherwise indicated, vertical direction refers to the vertical direction in FIG. 1, which represents the vertical direction with the engine mount 10 installed.

More specifically, the first mounting member 12 is of generally inverted frustoconical configuration, with a mounting bolt 18 implanted projecting upward at the large-diameter end thereof. The first mounting member 12 is then fixedly mounted to the power unit side by means of the mounting bolt 18.

The second mounting member 14, on the other hand, has a large-diameter, generally stepped cylindrical shape, with a step portion 20 that extends in the horizontal direction (sideways in FIG. 1) formed in the medial portion in the axial direction thereof, and with a large-diameter portion 22 and a small-diameter portion 24 formed above and below the step portion 20. While not shown in the drawing, a seal rubber layer is formed covering the inside peripheral face of the second mounting member 14.

On the lower opening of the second mounting member 14 is disposed a diaphragm 26 by way of a flexible film. The diaphragm 26 consists of a thin, readily deforming rubber film, having a generally disk shape with some sag. The outer peripheral edge of the diaphragm 26 is vulcanization bonded to the rim of the lower opening of the second mounting member 14, whereby the lower opening of the second mounting member 14 is covered fluid tightly by the diaphragm 26. In the center portion of the diaphragm 26, a coupling member 28 of generally inverted cup shape is inserted and bonded by vulcanization therewith. That is, the diaphragm 26 is formed as an integrally vulcanization molded component comprising the second mounting member 14 and the coupling member 28.

The second mounting member 14 has a bracket 29 fastened fitted externally thereon. This bracket 29 has a structure wherein a support cylinder member 32 is fitted externally onto a metallic rebound member 31 of large-diameter cylindrical shape. The rebound member 31 is mounted by being fastened member externally onto the large-diameter portion 22 of the second mounting member 14. The rebound member 31 extends out upwardly from the second mounting member 14, and the distal end portion projects inwardly to constitute a rebound stopper. This rebound stopper is abutted from above by the first mounting member 12, whereby the level of relative displacement of the first mounting member 12 and the second mounting member 14 in the rebound direction (direction of separation) is restricted in a cushionwise manner. Meanwhile, on the outside peripheral face of the support cylinder member 32, there are fastened a number of leg portions 30 extending downward. The second mounting member 14 is fastened to the vehicle body via the bracket 29 by bolting the leg portions 30 onto the vehicle body side (not shown).

The first mounting member 12 is positioned generally coaxially with respect to the second mounting member 14, and spaced apart thereabove. The rubber elastic body 16 is disposed between the first mounting member 12 and the second mounting member 14.

The rubber elastic body 16 has a generally frustoconical shape overall, with a recess 34 of inverted bowl shape opening downward formed on the large-diameter end face thereof. The first mounting member 12 is vulcanization molded in an inserted state to the small-diameter end face of the rubber elastic body 16; and a metal sleeve 36 of large-diameter, generally cylindrical shape serving as a medial sleeve is vulcanization bonded to the outside peripheral face at the large-diameter end of the rubber elastic body 16. That is, the rubber elastic body 16 is constituted as an integrally vulcanization molded component comprising the first mounting member 12 and the metal sleeve 36.

With the metal sleeve 36 member into the large-diameter portion 22 of the second mounting member 14, by means of press member the metal sleeve 36 into the large-diameter portion 22 or subjecting the large-diameter portion 22 to drawing or other diameter reduction process, the rubber elastic body 16 is secured member fluid tightly to the second mounting member 14. With this arrangement, the upper opening of the second mounting member 14 is covered fluid tightly by the rubber elastic body 16, and the area between the rubber elastic body 16 and the diaphragm 26 inside the second mounting member 14 is isolated fluid tightly from the outside. Within this isolated zone are accommodated a metallic orifice member 38 and a partition member 40.

The orifice member 38 and the partition member 40 are of generally disk shape. The orifice member 38 and the partition member 40 are inserted sequentially in the axial direction from the opening of the large-diameter portion 22 of the second mounting member 14, with the outer peripheral edge portion of the partition member 40 superimposed against the step portion 20 of the second mounting member 14 and the outer peripheral edge portion of the orifice member 38 superimposed against the outer peripheral edge portion of the partition member 40 on the one hand, while the metal sleeve 36 is secured press-fit into the large-diameter portion 22, and the large-diameter portion 22 and small-diameter portion 24 of the second mounting member 14 are subjected to a diameter reduction process. By so doing, the orifice member 38 and the partition member 40 are superimposed fluid tightly at their outside peripheral edge portions against the rubber elastic body 16 and the seal rubber layer formed on the inside peripheral face of the second mounting member 14, and thereby secured member fluid tightly to the second mounting member 14.

By fluid tightly partitioning the area between the rubber elastic body 16 and the diaphragm 26 inside the second mounting member 14 with the orifice member 38 and the partition member 40, to one side (the upper side in FIG. 1) of the orifice member 38 and the partition member 40 there is formed a primary fluid chamber 42 a portion of whose wall is constituted by the rubber elastic body 16, and which gives rise to pressure fluctuation on the basis of elastic deformation of the rubber elastic body 16 produced by vibration input across the first mounting member 12 and the second mounting member 14; while to the other side (the lower side in FIG. 1) there is formed an equilibrium chamber 44 a portion of whose wall is constituted by the diaphragm 26 and which readily undergoes changes in volume on the basis of elastic deformation of the diaphragm 26. The primary fluid chamber 42 and equilibrium chamber 44 each contain a non-compressible fluid sealed therein. As the non-compressible fluid there may be employed, for example, water, alkylene glycol, polyalkylene glycol, silicone oil, or the like. Preferably, in order to effectively achieve vibration damping action on the basis of flow action, e.g. resonance action, of the fluid, a low-viscosity fluid of 0.1 Pa·s or less will be employed. Sealing of the non-compressible fluid within the primary fluid chamber 42 and the equilibrium chamber 44 may be accomplished, for example, by assembling the integral vulcanization molded component of the rubber elastic body 16 comprising the first mounting member 12 and the metal sleeve 36; the integral vulcanization molded component of the diaphragm 26 comprising the second mounting member 14 and the coupling member 28; the orifice member 38; the partition member 40 etc. in the manner described above, while immersed in the non-compressible fluid.

In the center portion of the orifice member 38, there is formed a center wall portion 46 of inverted cup shape projecting out towards the primary fluid chamber 42 side. The lower portion (face) of the orifice member 38 is superimposed in close contact with the diametrically medial portion of the partition member 40 (specifically, the seal rubber 48 and partition rubber 50 described later), whereby the lower opening of the center wall portion 46 is provided with fluid tight closure by the partition member 40. Thus, there is formed between the center wall portion 46 and the partition member 40 a secondary fluid chamber 52 having non-compressible fluid sealed therein. The center of the upper floor portion of the center wall portion 46 is perforated by a large communication hole 54. By means of this, the primary fluid chamber 42 and the secondary fluid chamber 52 communicate with each other, permitting flow of fluid through the communication hole 54 between the primary fluid chamber 42 and the secondary fluid chamber 52. As will be apparent thereby, in this embodiment, the pressure receiving chamber whose wall is constituted in part by the rubber elastic body 16 and that receives input vibration is constituted including the primary fluid chamber 42 and the secondary fluid chamber 52. Additionally, in this embodiment, the passage length and passage cross sectional area of the communication hole 54 are modified such that, on the basis of resonance or other flow action of fluid caused to flow through the communication hole 54, effective vibration damping of, for example, medium-frequency, medium-amplitude vibration such as idling vibration on the order of ±0.1–0.25 mm and 20–40 Hz, is achieved.

Figure 2:
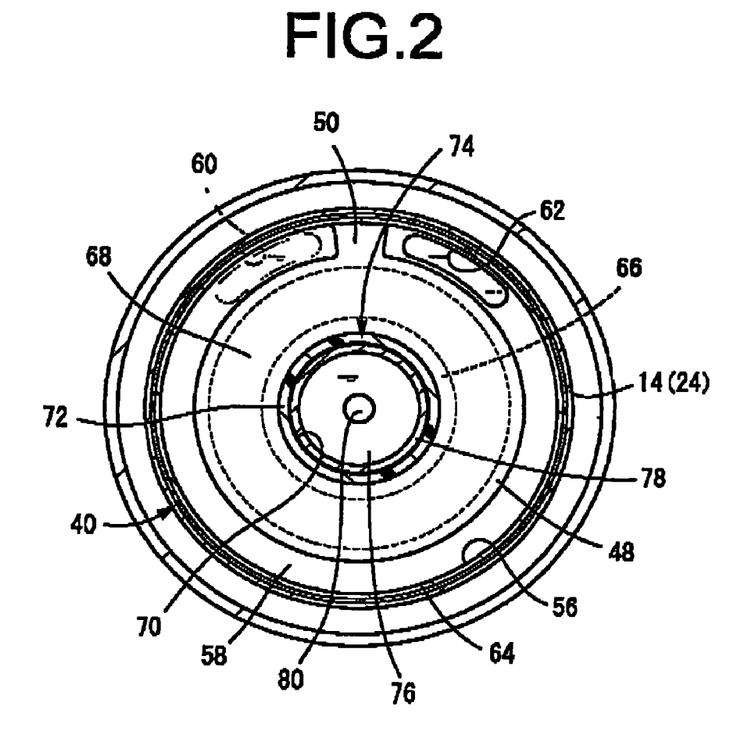
FIG. 2 is a cross sectional view taken along line 2—2 of FIG. 1.

As shown in FIG. 2 as well, in proximity to the outer peripheral edge portion of the partition member 40, there is formed a circumferential groove 56 that opens upwardly and extends a certain length in the circumferential direction (e.g. extending approximately once around the circumference) with a generally unchanging recessed cross section. The inner peripheral edge portion of the circumferential groove 56 is covered over substantially the entire circumference by an upwardly-projecting seal rubber 48 of annular shape when viewed in plan view. One location on the circumference of the circumferential groove 56 is filled with a partition rubber 50 integrally formed with the seal rubber 48.

The peripheral wall portion of the orifice member 38 is inserted into the peripheral wall portion of the partition member 40, and the bottom wall portion of the orifice member 38 is superimposed in close contact against the seal rubber 48 and the partition rubber 50 of the partition member 40, whereby the circumferential groove 56 is provided with fluid tight closure by the orifice member 38. With this arrangement, to the outer peripheral side of the orifice member 38 and the partition member 40 there is formed an orifice passage 58 that extends a predetermined length in the circumferential direction (e.g. less than once around the circumference). A first end of this orifice passage 58 connects with the primary fluid chamber 42 via a communication hole 60 formed in the outer peripheral portion of the orifice member 38 to one side in the circumferential direction (to the left in FIG. 2) of the partition rubber 50 which is affixed to the circumferential groove 56; while the other end of the orifice passage 58 connects to the equilibrium chamber 44 via a communication hole 62 bored through the bottom of the circumferential groove 56, to the other side in the circumferential direction (to the right in FIG. 2) of the partition rubber 50. In this embodiment, the passage length and passage cross sectional area of the orifice passage 58 are modified such that, on the basis of resonance or other flow action of fluid caused to flow through the orifice passage 58, effective vibration damping of, for example, low-frequency, large-amplitude vibration such as engine shake on the order of ±0.1–1.0 mm and 10 Hz, is achieved.

As a result, when low-frequency, large-amplitude vibration such as shake is input across the first mounting member 12 and the second mounting member 14, fluid flow through the orifice passage 58 between the primary fluid chamber 42 and the equilibrium chamber 44 is generated on the basis of relative pressure fluctuations produced between the two chambers 42, 44, whereby vibration damping action (high attenuating action) is manifested on the basis of resonance or other flow action of fluid caused to flow through the orifice passage 58.

In this embodiment, the partition member 40 is constituted to include a main body support ring 64, a guide member 66, and an annular rubber elastic body 68. The main body support ring 64 serving as an annular fastening member is of large-diameter, generally annular shape, and is constituted by the outer peripheral portion of the partition member 40 which comprises the seal rubber 48, the circumferential groove 56 and the partition rubber 50. Specifically, the main body support ring 64, by means of its outer peripheral edge portion being sandwiched between the metal sleeve 36 and the second mounting member 14, is fixedly support in fluid tight fashion on the second mounting member 14, with the inner peripheral edge portion thereof projecting diametrically inward for a predetermined length.

The guide member 66 serving as an annular guide member is of thin, generally annular disk shape. The guide member 66 is formed of synthetic resin material such as polyacetal or polytetrafluoroethylene for example; the coefficient of rebound thereof is smaller than the coefficient of rebound of a member fabricated of iron or other metal material, and the sliding friction is lower than the sliding friction of a member fabricated of natural rubber or other rubber material. In preferred practice, the synthetic resin material will have heat resistance temperature and thickness dimension sufficient to withstand the vulcanization molding temperature of the annular rubber elastic body 68 discussed later.

The center hole of the guide member 66 is a through hole 70 of generally circular shape. On the rim of the through hole 70 is integrally formed a guide sleeve 72 of generally cylindrical shape projecting upward in the axial direction. The inside peripheral face of the guide sleeve 72 is generally coplanar with the through hole 70.

Additionally, the main body support ring 64 is positioned spaced apart diametrically outward from the guide member 66, with the main body support ring 64 and the guide member 66 arranged generally concentrically about the center axis of the engine mount 10. Thus, the guide member 66 is constituted as the center portion of the partition member 40, and the through hole 70 is positioned approximately on the center axis of the mounting proper. The annular rubber elastic body 68 is disposed between the guide member 66 and the main body support ring 64.

The annular rubber elastic body 68 serving as the elastic support member has a generally annular disk shape that extends with substantially unchanging cross section continuously all the way around in the circumferential direction; and it is formed of elastically deformable rubber film. The outer peripheral edge portion of the annular rubber elastic body 68 is vulcanization bonded to the inner peripheral edge portion of the main body support ring 64, and the inner peripheral edge portion of the annular rubber elastic body 68 is vulcanization bonded to the outer peripheral edge portion of the guide member 66. By means of this arrangement, the annular rubber elastic body 68 is positioned extending at an approximately right angle to the direction of opposition of the primary fluid chamber 42, the secondary fluid chamber 52 and the equilibrium chamber 44, as well as being formed as an integrally vulcanization molded component that comprises the main body support ring 64 and the guide member 66. The annular rubber elastic body 68 constitutes the diametrically medial portion of the partition member 40, as well as constituting part of the wall of the pressure receiving chamber which comprises the primary fluid chamber 42 and the secondary fluid chamber 52. The annular rubber elastic body 68 is integrally formed with the seal rubber 48 formed covering the main body support ring 64 and with the partition rubber 50.

By means of this arrangement, the annular rubber elastic body 68 is disposed extending with substantially unchanging cross sectional shape all the way around the center axis of the guide member 66 (the center axis of the mounting) in the circumferential direction; and the main body support ring 64, the guide member 66 and the annular rubber elastic body 68 are positioned with their center axes on substantially the same line. The guide member 66 is elastically supported via the annular rubber elastic body 68, on the main body support ring 64, and hence on the second mounting member 14.

The characteristic frequency of the annular rubber elastic body 68 is tuned to the frequency band of the vibration to be damped, in a higher frequency band than the tuning frequency of the orifice passage 58. Specifically, the characteristic frequency is tuned such that on the basis of deformation of the annular rubber elastic body 68 resonance is effectively generated in the annular rubber elastic body 68 against high-frequency, small-amplitude vibration such as booming noises on the order of ±0.1–0.02 mm and 60–120 Hz, for example.

Additionally, an excitation plate 74 is disposed within the through hole 70 of the guide member 66. The excitation plate 74 is fabricated of rigid material such as metal or synthetic resin, and has a main plate portion 76 of generally disk shape, as well as a rim portion 78 of generally cylindrical shape integrally formed at the outer peripheral edge of the main plate portion 76 and projecting out to both sides in the axial direction. Here, the outside diameter dimension of the excitation plate 74 is made slightly smaller than the diameter dimension of the through hole 70 (the inside diameter dimension of the guide sleeve 72). The excitation plate 74 is then fitted into the guide sleeve 72.

The excitation plate 74 fits into the through hole 70 with a gap dimension small enough to substantially form no fluid flow passage. The gap dimension: 1 (mm), in other words, the diametrical distance: 1 (mm) which separates the outer peripheral face of the main plate portion 76 and the rim portion 78 that make up the excitation plate 74, and the inner peripheral face of the guide member 66 furnished with the guide sleeve 72, is not particularly critical, and is established, for example, such that $1 \leq 0.5$, preferably $0.1 \leq 1 \leq 0.3$. Between the diametrically opposed outer peripheral face of the excitation plate 74 and inner peripheral face of the guide member 66 is formed a tiny gap that extends continuously or discontinuously around generally the entire circumference.

By means of this arrangement, the excitation plate 74 comprising the main plate portion 76 and the rim portion 78 is capable of relative displacement in the axial direction, while being guided by the guide sleeve 72. Specifically, the main plate portion 76 is disposed within the through hole 70 so as to spread out in generally the axis-perpendicular direction, with the rim portion 78 membre over a sufficient length thereof in the axial thereof into the through hole 70 of the guide member 66 furnished with the guide sleeve 72, and with at least one of the ends of the rim portion 78 projecting axially outward from the bottom end of the guide member 66 or the upper end of the guide sleeve 72.

A caulking projection 80 projects upward from the center of the coupling member 28. This caulking projection 80 is passed through a fastening hole 82 bored in the center of the excitation plate 74 and the caulking projection 80 is subjected to a caulking process, whereby the excitation plate 74 and the coupling member 28 are fastened together fluid tightly.

Below the second mounting member 14 with the excitation plate 74 and the coupling member 28 disposed thereon, there is disposed an electromagnetic actuator 84 serving as electromagnetic actuating assembly. The electromagnetic actuator 84 pertaining to this embodiment may be of known design. For example, an actuator like that taught in JP-A-2003-339145 may be used, and thus a detailed description will not be provided here; however, the general structure is one in which a cylindrical yoke member 88 constituting the stator is disposed some distance to the outer peripheral side of a movable member 86 constituting the mover, a coil 90 and a permanent magnet 92 are attached to the yoke member 88, and the movable member 86 and the yoke member 88 are actuated and made to undergo relative displacement in the axial direction, on the basis of electromagnetic force generated between the movable member 86 and the yoke member 88 by applying an electric current through the coil 90.

Specifically, the yoke member 88 is fabricated from laminate steel plate composed of ferromagnetic material, and while not depicted explicitly in the drawing, it has a structure wherein a pair of magnetic pole portions 94, 94 project in opposition from an annular outer peripheral magnetic path onto the inner peripheral face. The coils 90 serving as coil members are wound around the pair of magnetic pole portions 94, 94. The area around each coil 90 is covered by an electrical insulating layer 96.

On each of the inwardly projecting distal end faces of the pair of magnetic pole portions 94, 94 in the yoke member 88 there are disposed a plurality (four in this embodiment) of permanent magnets 92 arranged in opposition spaced apart by a predetermined distance. These permanent magnets 92 are magnetized in the axis-perpendicular direction (sideways in FIG. 1); in this embodiment in particular, there are employed two types, namely, a permanent magnet 92*a* whose inside peripheral face is the N pole face and whose outside peripheral face is the S pole face, and a permanent magnet 92*b* whose inside peripheral face is the S pole face and whose outside peripheral face is the N pole face. A plurality of permanent magnets 92*a* and permanent magnets 92*b* are attached in alternating fashion to the inner peripheral face of the yoke member 88 (inwardly projecting distal end faces of the magnetic pole portions 94), so as to be positioned adjacently in the axial direction. By so doing, the magnetic pole faces (portions) in the plurality of permanent magnets 92 have alternately differing polarity in the axial direction.

A fixing housing 98 is disposed to the outer peripheral side of the yoke member 88. The fixing housing 98 has an inverted cup shape, and is constituted to include a large-diameter cylindrical portion 100 that extends in the axial direction, and an upper floor portion 102 of generally flat plate shape integrally affixed to the upper end portion of the cylindrical portion 100. The yoke member 88 is fixed to the axially medial portion of the cylindrical portion 100, by means of being press-fit therewith, or inserted into the cylindrical portion 100 and subjected to a diameter reduction process, so as to be affixed extending in the axis-perpendicular direction within the fixing housing 98.

On the outer peripheral portion of the upper floor portion 102 are affixed a plurality of support bolts 104 that extend a predetermined length in the axial direction, with upper and lower plate springs 106 disposed as metal plate springs on the support bolts 104. The plate spring 106 is of thin annular plate form, fabricated of spring steel or the like. Where necessary, it is possible to adjust the real effective spring length of the plate spring 106 by means of forming an appropriate slit or the like, to carry out tuning of the spring characteristics. Besides metal plate springs like those illustrated, it would be possible to employ flat elastic materials of resin or synthetic resin instead.

The upper and lower plate springs 106, 106 are installed extending in the axis-perpendicular direction, spaced apart in the axial direction within the fixing housing 98, affixed at the outer peripheral portions thereof by means of passing the support bolts 104 of the fixing housing 98 through a plurality of spacers 108, 108, 108 and threading nuts onto the support bolts 104. A pair of insertion holes 110, 110 are formed in the diametrically medial portion of the plate springs 106, and during installation of the plate springs 106 as described above, the coil 90 is passed through the insertion holes 110, effectively ensuring elastic deformation of the plate springs 106.

On the inner peripheral side of the yoke member 88, the inserted movable member 86 is positioned generally coaxially. The movable member 86 is constituted to include a fixing sleeve 112 of elongated tube shape extending straight in the axial direction, and upper and lower magnetic rings 114, 114 of thin annular shape; and is fabricated of ferric metal or other ferromagnetic material. A collar 116 that extends diametrically outward is integrally formed in proximity to the upper end of the movable member 86.

An actuating rod 118 as the output member is fitted externally onto the fixing sleeve 112, and affixed by means of a lock nut threaded onto the bottom end. The actuating rod 118 has a generally solid cylindrical shape, and is fabricated using ferric metal or other ferromagnetic material.

The upper plate spring 106*a*, the upper spacer 120*a*, the upper magnetic ring 114*a*, the middle spacer 120*b*, the lower magnetic ring 114*b*, the lower spacer 120*c*, the lower plate spring 106*b*, and a washer 122 are slipped in that order around the outside of the fixing sleeve 112, so as to be stacked in the axial direction against the collar 116 of the fixing sleeve 112. By threading a fixing nut 124 on the lower end of the fixing sleeve 112, with the pair of magnetic rings 114*a*, 114*b* situated spaced apart in the axial direction, the upper and lower plate sprints 106*a*, 106*b*, the upper, middle, and lower spacers 120*a*, 120*b*, 120*c*, the upper and lower magnetic rings 114*a*, 114*b*, and the washer 122 are clamped in the axial direction by the collar 116 of the fixing sleeve 112 and the fixing nut 124, and affixed thereby to the fixing sleeve 112 and hence to the actuating rod 118.

The yoke member 88 is affixed to the second mounting member 14 via the fixing housing 98, by means of the upper floor portion 102 of the fixing housing 98 being inserted into and caulked to a cylindrical caulking portion 126 integrally formed at the lower end of the second mounting member 14. As a result, the electromagnetic actuator 84 is attached to the second mounting member 14 below the diaphragm 26.

By means of this arrangement, the actuating rod 118 with the affixed movable member 86 is inserted into the yoke member 88, with the movable member 86, actuating rod 118 and yoke member 88 positioned generally coaxially. Based on the fact that the movable member 86 and the yoke member 88 are elastically coupled by the pair of plate springs 106, 106 via the fixing housing 98, the actuating rod 118 and the yoke member 88 allow some elastic relative displacement in the axial direction, on generally the same center axis. The movable member 86 is situated in opposition spaced apart by a predetermined distance in the axis-perpendicular direction from the plurality of permanent magnets 92 affixed to the inner peripheral face of the yoke member 88, and in particular the axis-perpendicular projecting distal ends of the magnetic rings 114 in the movable member 86 and the magnetic pole faces on the inner peripheral side of the plurality of permanent magnets 92 are situated in opposition in the axis-perpendicular direction a slight distance apart.

The upper end portion (face) of the actuating rod 118 slides through a large-diameter through hole 128 bored in the center of the upper floor portion 102 of the fixing housing 98, and is positioned in opposition to the excitation plate 74 spaced apart therefrom in the axial direction.

A yoke portion 130 serving as the yoke member is integrally formed at the upper end of the actuating rod 118. The yoke portion 130 has the form of a large-diameter, generally bottomed cylinder, extending outwardly in the axis-perpendicular direction from the upper end of the actuating rod 118 and opening in a generally circular recess shape towards the excitation plate 74 situated thereabove. The outside diameter dimension of the yoke portion 130 is slightly smaller than the diameter dimension of the through hole 128, on the basis of which stable displacement in the axial direction of the actuating rod 118 is assured.

Figure 3:
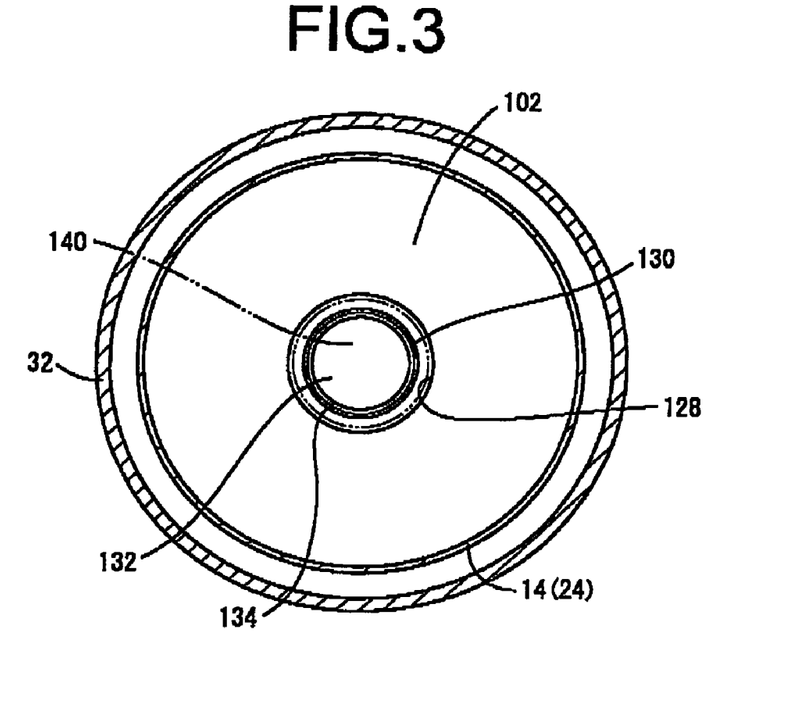
FIG. 3 is a cross sectional view taken along line 3—3 of FIG. 1.

A permanent magnet 132 is disposed within the yoke portion 130. As shown in FIG. 3, the permanent magnet 132 takes the form of a thin, generally disk shaped element, magnetized in the axial direction. The outside diameter dimension of the of the permanent magnet 132 is smaller than the inside diameter dimension of the yoke portion 130. The thickness dimension of the of the permanent magnet 132 is about the same as the depth dimension of the yoke portion 130. The material of the permanent magnet 132 may be modified appropriately depending on the required attractive force, manufacturability, and so on, and is not limited in any particular way; for example, well-known ferrite or ALNICO (trade name) could be used. The permanent magnet 132 pertaining to this embodiment may employ either an isotropic magnet in which uniform magnetic force acts uniformly in all directions, or an anisotropic magnet in which magnetic force acts more strongly is a particular direction.

The permanent magnet 132 is inserted into the yoke portion 130 so that the permanent magnet 132 and the yoke portion 130 are positioned on generally the same center axis, with one magnetic pole (e.g. the N pole) face of the permanent magnet 132 superimposed against the bottom face of the yoke portion 130 and affixed thereto with adhesive or the like. With this arrangement, the permanent magnet 132 is affixed with the other magnetic pole (e.g. the S pole) face at the distal end portion that faces the excitation plate 74 of the actuating rod 118 extending towards the excitation plate 74, and is disposed extending in the axis-perpendicular direction in the approximate center of the engine mount 10. The upper magnetic pole face (other magnetic pole face) of the permanent magnet 132 and the open end of the yoke portion 130 are generally coplanar, and both are constituted as flat surfaces.

By disposing the peripheral wall portion of the permanent magnet 132 around the entire circumference thereof so as to be positioned in opposition spaced apart in the axis-perpendicular direction from the peripheral wall portion of the yoke portion 130, an annular gap 134 that extends continuously in the circumferential direction is formed between the opposed faces of the permanent magnet 132 and the yoke portion 130. By means of this, flux leakage from the permanent magnet 132 is prevented, and the permanent magnet can be made to produce greater attractive force.

A downwardly projecting mounting bolt 136 is integrally disposed in the center of the coupling member 28 that has been vulcanization bonded to the center portion of the diaphragm 26. An attracted member 138 serving as a magnetic member is affixed threaded onto this mounting bolt 136. The attracted member 138 has the form of a small-diameter solid cylinder, and is formed of ferromagnetic material such as ferric metal. Accordingly, the attracted member 138 is coupled with the excitation plate 74 via the coupling member 28, and is positioned generally on the center axis of the engine mount 10.

In this embodiment in particular, a large-diameter disk portion 140 is integrally formed at the bottom end of the attracted member 138. The outside diameter dimension of the disk portion 140 is larger than the outside diameter dimension of the permanent magnet 132, and smaller than the diameter dimension of the through hole 128 in the upper floor portion 102 of the fixing housing 98. Based on the fact that the lower end face of the disk portion 140 is constituted as a flat surface, and that the attracted member 138 extends in the axial direction of the mounting (vertically in FIG. 1), it extends generally orthogonal to the axial direction of the mounting, i.e. in the axis-perpendicular direction.

By superimposing a magnetic pole face of the permanent magnet 132 against the bottom end face of the disk portion 140 so that the permanent magnet 132 and the excitation plate 74 are positioned coaxially with the engine mount 10, the permanent magnet 132 is affixed by attraction to the attracted member 138, on the basis of the magnetic force of the permanent magnet 132. By means of this, the excitation plate 74 is coupled to the actuating rod 118 affixed to the moveable member 86 of the electromagnetic actuator 84, so as to undergo excited displacement in the axial direction on the basis of displacement of the actuating rod 118. Additionally, the center axis of the excitation plate 74 and the center axis of the actuating rod 118 are positioned on the approximate center axis of the engine mount 10, and they extend parallel to the vertical. As will be apparent from the above, the coupling portion that perforates fluid tightly from the excitation plate 74 through the center portion of the diaphragm 26 and projects towards the actuating rod 118 to couple with the actuating rod 118 is constituted to include the attracted member 138.

During displacement of the actuating rod 118 in the axial direction, the attractive force of the permanent magnet 132 on the attracted member 138 is greater than the force exerted on the attracted member 138 in the direction of relative displacement of the attracted member 138 and the actuating rod 118. As a result, during operation of the electromagnetic actuator 84, the excitation plate 74 and the actuating rod 118 are stably coupled.

Figure 4:
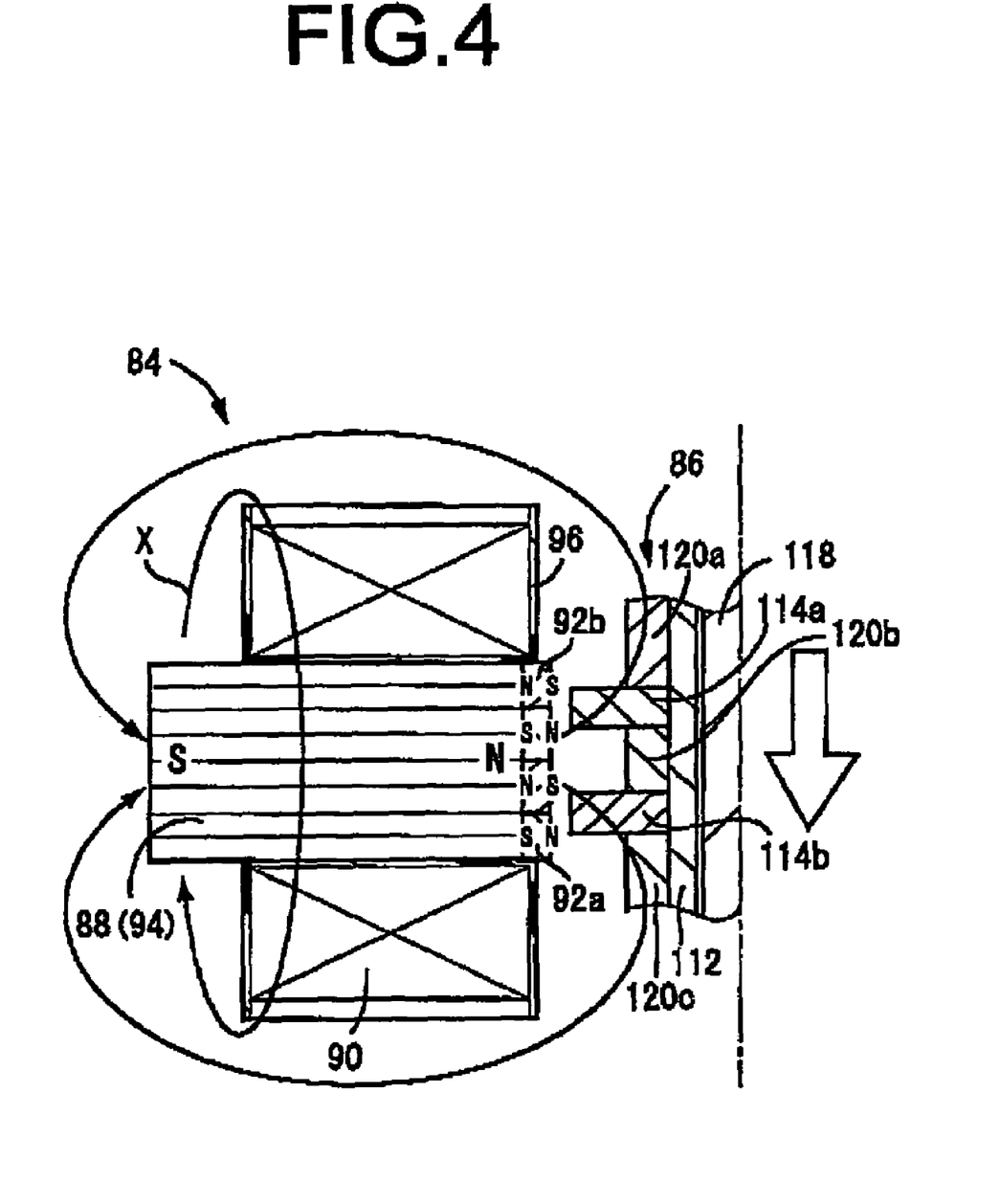
FIG. 4 is an enlarged schematic view suitable for explaining operation of an electromagnetic actuator of the engine mount of FIG. 1.

In the engine mount 10 of this construction, as depicted in model form in FIG. 4, by means of current flow to the coil 90 in the electromagnetic actuator 84 in the X direction in FIG. 4 for example, an N pole is produced on the inward side (right in FIG. 4) in the diametrical direction of the yoke member 88, while an S pole is produced on the other side (left in FIG. 4) in the diametrical direction. Current flowing in the reverse direction to the coils 90, 90 reverses the N and S poles produced in the yoke member 88. Thus, by supplying alternating current to the coil 90, the N poles and S poles of the plurality of permanent magnets 92 disposed on the yoke member 88 alternately weaken and strengthen. As a result, magnetic force directed one way in the axial direction and magnetic force directed the other way alternately acts on the magnetic rings 114, 114 of the actuating rod 118, causing the actuating rod 118 to reciprocate in both the up and down directions from its equilibrium position in the absence of applied current (the position shown in FIG. 1). The magnetic rings 114 may have magnetic poles situated at the faces superimposed to the permanent magnets 92, thereby affording an even higher level of actuating force.

With this arrangement, by performing adaptive control or other such feedback control using the engine ignition signal of the power unit as a reference signal and a vibration detection signal for a damped component such as the vehicle body for example, the flow of current to the coil 90 is controlled to cause the actuating rod 118 to undergo exciting actuation. As a result, when low-frequency vibration, such as engine shake for example, is input, pressure fluctuations are effectively generated between the equilibrium chamber 44 and the pressure receiving chamber comprising the primary fluid chamber 42 and the secondary fluid chamber 52, so as to provide actuation control of the excitation plate 74, whereby ample flow of fluid through the orifice passage 58 is assured, and damping action on the basis of resonance or other flow action of fluid through the orifice passage 58 is more advantageously realized.

When medium-frequency, medium-amplitude vibration, such as engine idling for example, is input, by means of the excitation plate 74 being subjected to actuating force that corresponding to this vibration, the internal pressure of the pressure receiving chamber comprising the primary fluid chamber 42 and the secondary fluid chamber 52 is controlled on the basis of excited actuation of the excitation plate 74, so that active and dynamic vibration damping of medium-frequency vibration is effectively realized.

Particularly, in conjunction with tuning the resonance frequency of fluid caused to flow through the communication hole 54 of the orifice member 38 to the medium-frequency vibration band such as idling vibration in order to obtain dynamic damping action by the excitation plate 74, pressure fluctuations produced in the primary fluid chamber 42 and the secondary fluid chamber 52 on the basis of excited actuation of the excitation plate 74 are efficiently transmitted, utilizing resonance action of fluid caused to flow through the communication hole 54, when exerted on the primary fluid chamber 42 through the communication hole 54. By actively and dynamically controlling pressure fluctuations in the primary fluid chamber 42 and the secondary fluid chamber 52, the vibration transmission characteristics of the first mounting member 12 and the second mounting member 14 coupled by the rubber elastic body 16 are adjusted in order to advantageously achieve the intended damping action.

During input of high-frequency vibration such as driving rumble or booming noises for example, since pressure fluctuations in the pressure receiving chamber comprising the primary fluid chamber 42 and the secondary fluid chamber 52 are very small, the pressure fluctuations in the pressure receiving chamber are effectively absorbed or diminished by means of follower deformation of the annular rubber elastic body 68 in response to the vibration. Additionally, by tuning the characteristic frequency of the annular rubber elastic body 68 to the high-frequency vibration to be damped, follower deformation can be more advantageously achieved on the basis of resonance of the annular rubber elastic body 68. Thus, during input of vibration in the high-frequency range, even if the orifice passage 58 should become substantially blocked, violent pressure fluctuations in the pressure receiving chamber can be avoided by means of the annular rubber elastic body 68, and excellent vibration damping action can be achieved through effective vibration isolating action on the basis of low spring characteristics.

In the engine mount 10 of this embodiment, the magnetic force of the permanent magnet 132 is utilized when coupling the actuating rod 118 and the excitation plate 74. With this arrangement, even in the event of so-called axial misalignment, whereby the center axis of the actuating rod 118 and the center axis of the excitation plate 74 become eccentric to one another in the axis-perpendicular direction due to input of external force from a direction at a right angle to the direction of displacement of the actuating rod 118 or to dimensional error of components relating to the actuating rod 118 or the excitation plate 74 for example, the actuating rod 118 and the excitation plate 74 are nevertheless coupled, with their center axes eccentric in the axis-perpendicular direction and extending in the direction of displacement of the actuating rod 118.

Accordingly, it is possible to avoid the problem of inclination of the center axis of the excitation plate 74 and/or the actuating rod 118 with respect to the direction of displacement of the actuating rod 118, which can be caused by forced relative displacement of the actuating rod 118 and the excitation plate 74 in order to position the center axis of the actuating rod 118 and the center axis of the excitation plate 74 on the same line in the direction of displacement of the actuating rod 118, such as is done with conventional coupling means such as bolting, pressure member, or caulking. That is, production of a high level of stress in the direction orthogonal to the displacement direction in the coupling section of the actuating rod 118 with the excitation plate 74 may be avoided. Thus, durability of the coupling section may be advantageously achieved, and displacement of the actuating rod 118 may be efficiently transmitted to the excitation plate 74, whereby the desired vibration damping action is consistently achieved.

In this embodiment, as compared to conventional coupling means, the coupling operation is simpler, and an excessive degree of exactitude is not necessary in the dimensions of the actuating rod 118 and the excitation plate 74 or in the positioning of the electromagnetic actuator 84 on the second mounting member 14, whereby production efficiency may be improved, and production costs reduced.

Additionally, in this embodiment, it is possible to appropriate modify the coupling state of the excitation plate 74 and the actuating rod 118, by means of adjusting the magnetic force through modification of the shape, size, or material of the permanent magnet 132. As a result, it is possible to adjust magnetic force so as to allow displacement by a certain amount in the direction orthogonal to the displacement direction of the actuating rod 118 and the excitation plate 74, with the actuating rod 118 and the excitation plate 74 kept in a coupled state, during input of external force to the electromagnetic actuator 84 or excitation plate 74 from a direction orthogonal to the actuating rod 118, for example. Thus, stress created in the coupling section of the actuating rod 118 and the excitation plate 74 when external force is input may be more advantageously reduced, affording a more stable coupling state.

In this embodiment in particular, the outside diameter dimension of the disk portion 140 of the attracted member 138 superimposed against a magnetic pole face of the permanent magnet 132 is larger than the outside diameter dimension of the magnetic pole face, whereby at least a portion of the outer peripheral edge of the disk portion 140 is superimposed projecting outwardly in the axis-perpendicular direction beyond the outer peripheral edge of the magnetic pole face. As a result, it is possible to avoid a situation where, in the case that the disk portion 140 and the magnetic pole face have the same outside diameter dimension, when axial misalignment of the excitation plate 74 and the actuating rod 118 occurs, and the permanent magnet 132 and the disk portion 140 are superimposed, the excitation plate 74 and the actuating rod 118 are subjected to force relative displacement by means of the centering function of the permanent magnet 132, so that they are superimposed with no misalignment of the outside edge portion of the permanent magnet 132 and the outside edge portion of the disk portion 140, i.e., so that the center axis of the excitation plate 74 and the center axis of the actuating rod 118 are situated on the same line. Specifically, in this embodiment, the center axis of the excitation plate 74 and the center axis of the actuating rod 118 extend in the direction of displacement of the actuating rod 118 (the vertical in FIG. 1), effectively avoiding inclination relative to the direction of displacement, and affording more stable coupling of the excitation plate 74 with the actuating rod 118.

Additionally, in this embodiment, flux leakage from the permanent magnet 132 is prevented by means of disposing the permanent magnet 132 accommodated within the yoke portion 130. It is therefore possible to make the permanent magnet 132 smaller while still obtaining the desired level of magnetic force, and thus to achieve lighter weight than with conventional coupling means such as bolt fastening, pin joining, or the like. This is effective in terms of reducing the inertia of the coupling section, and assuring a high level of controllability in the actuation responsiveness of the actuating rod 118, particularly during vibration in a high frequency range.

In this embodiment, the guide member 66 that is supported on the annular rubber elastic body 68 is disposed surrounding the excitation plate 74 with a slight gap therebetween, thereby advantageously preventing pressure leakage from the pressure receiving chamber through the gap. Additionally, in the event that axial misalignment of the excitation plate 74 should occur in association with coupling of the excitation plate 74 and the actuating rod 118 so that the excitation plate 74 and the guide member 66 come into abutment with one another, the reaction force exerted on the excitation plate 74 on the basis of this abutment will be effectively reduced on the basis of elastic deformation of the annular rubber elastic body 68. Thus, greater consistency of excited displacement of the excitation plate 74 is achieved.

Figure 5:
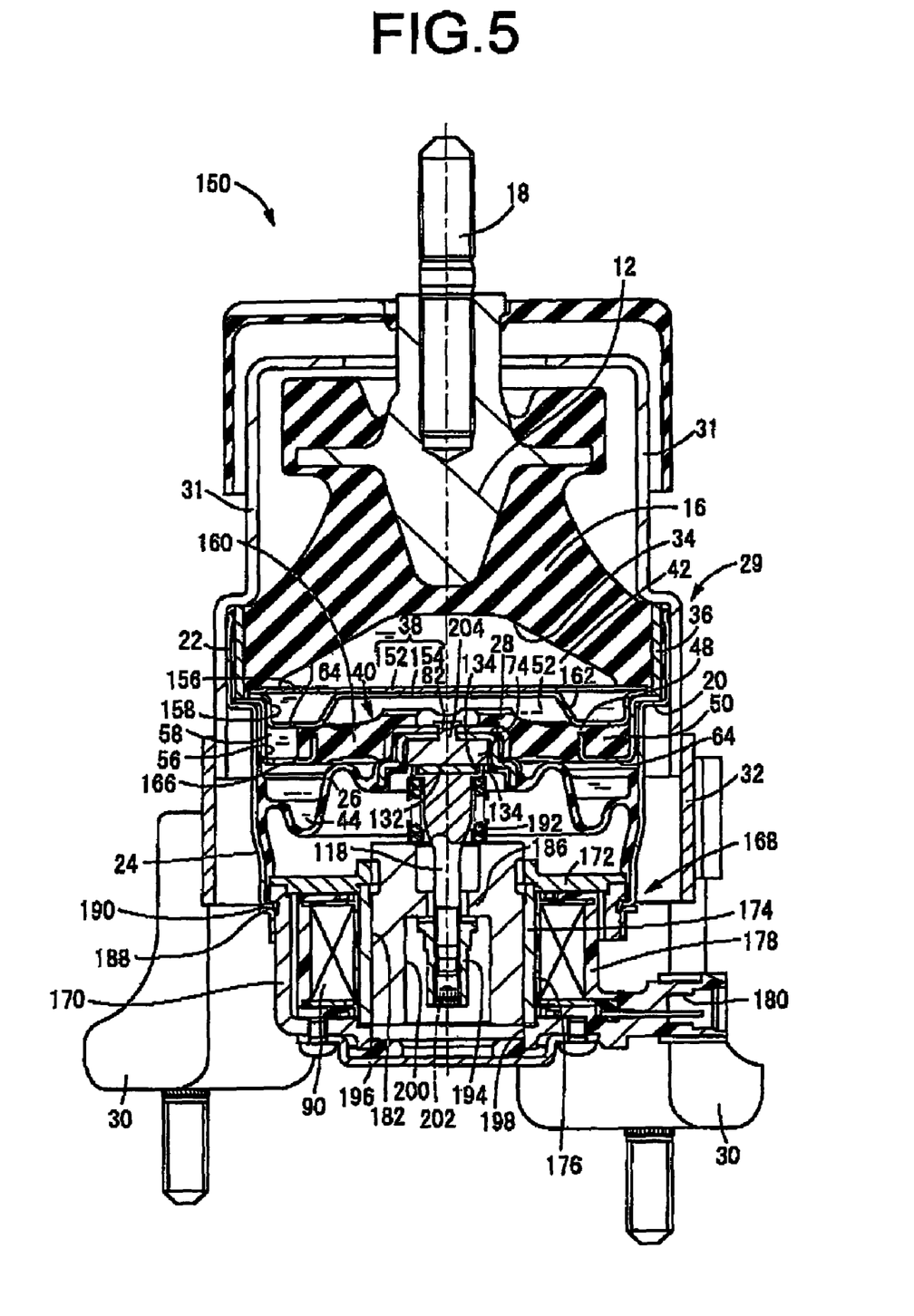
FIG. 5 is an elevational view in axial or vertical cross section of an automotive engine mount of construction according to a second embodiment of the invention.

FIG. 5 illustrates an automotive engine mount 150 by way of a second embodiment of the invention. This embodiment differs from the first embodiment in terms of the support mode of the excitation plate 74 and the structure of the electromagnetic actuator 84. In the description hereinbelow, components and areas that are substantially identical in structure to those of the first embodiment will be assigned the same symbols, and will not be described in any detail.

More specifically, the orifice member 38 of this embodiment is constituted by means of superposing in the axial direction an metallic upper cover member 152 and a metallic lower cover member 154 that have been fabricated by a pressing process or the like. The upper cover member 152 is of small-diameter, generally disk shape, and has integrally formed on a portion of the circumference thereof a diametrical coupling portion 156 that extends outwardly in the diametrical direction. The lower cover member 154 is of generally hat shape overall, having formed on its outer peripheral edge an upper circumferential groove 158 of recessed shape opening upward and extending a predetermined length around in the circumferential direction (in this embodiment, approximately once around the circumference). The upper cover member 152 is superimposed against the center upper floor portion of the lower cover member 154, and the diametrical coupling portion 156 of the upper cover member 152 is superimposed against the outer peripheral edge of the lower cover member 154, so as to be clamped between rubber elastic body 16 and the step portion 20 of the second mounting member 14 via the main body support ring 64. With this arrangement, the opening of the upper circumferential groove 158 communicates with the primary fluid chamber 42 through the diametrically outside of the upper cover member 152.

The partition member 40 of this embodiment has an annular support rubber elastic body 160 that extends in the axis-perpendicular direction. The inner peripheral edge of this support rubber elastic body 160 is vulcanization bonded to the outer peripheral edge of the excitation plate 74. The main body support ring 64 is vulcanization bonded to the outer peripheral edge of the support rubber elastic body 160. At the upper end of the outer peripheral side of the support rubber elastic body 160 is integrally formed a seal rubber 48, and at a site on the circumference of the support rubber elastic body 160 is integrally formed a partition rubber 50.

The bottom wall portion of the lower cover member 154 in the orifice member 38 is superimposed in close contact against the seal rubber 48 and the partition rubber 50 of the partition member 40, thereby forming a secondary fluid chamber 52 between the center wall portion 46 and the partition member 40. The secondary fluid chamber 52 connects to the primary fluid chamber 42 through at least one communication window 162 (in this embodiment, there are three, spaced apart in the circumferential direction) bored in the inside wall portion of the lower cover member 154.

The circumferential groove 56 on the outer peripheral side of the partition member 40 is covered fluid tightly by the lower cover member 154 of the orifice member 38. With this arrangement, there is formed an orifice passage 58, with one end of this orifice passage 58 connecting to the primary fluid chamber 42 through a communication hole 164 bored in the floor of the upper circumferential groove 158, and the other end of the orifice passage 58 connecting to an equilibrium chamber 44 through a communication hole 166 bored in the floor of the circumferential groove 68 in the main body support ring 64.

To the opposite side of the excitation plate 74 from the pressure receiving chambers 42, 52, there is disposed an electromagnetic oscillator 168 which serves as the electromagnetic actuating assembly pertaining to this embodiment. This electromagnetic oscillator 168 has a construction in which an outer yoke 170 made from ferromagnetic material of generally inverted cup shape is attached so as to enclose the outside of a coil 90, and an upper yoke 172 and a inner yoke 174 made from ferromagnetic material of annular shape is attached so as to enclose the upper side an inner peripheral side of the coil 90, forming a magnetic path.

The coil 90 is wound onto a bobbin 176 of nonmagnetic material, with the outer peripheral portion thereof covered by a cover member 178 of nonmagnetic material. The cover member 178 is produced, for example, by resin forming after the coil 90 has been wound onto the bobbin 176. A power feed opening 180 that projects to the outside from an opening made in the outer yoke 170 is integrally formed in the cover member 178, and power is supplied to the coil 90 through a terminal disposed within the power feed opening 180.

The inner peripheral face of the upper yoke 172 and the inner peripheral face of the inner yoke 174 cooperate, forming in the center of the two yokes 172, 174 a cylindrical inner peripheral face 182 as a center hole that extends in the axial direction. Within the inner peripheral face 182 is installed an armature consisting of a slider 184 of ferromagnetic material, disposed slidably in the axial direction.

The slider 184 has a cylindrical shape overall, and at its outer peripheral face is installed in the area of a time gap formed between the upper yoke 172 and the inner yoke 174, so as to be actuated in the axial direction when subjected to magnetic force by passing current through the coil 90. On the inner peripheral face of the slider 184, an annular mating projection 186 projects diametrically outward.

A mating groove 188 is incised in the opening of the outer yoke 170, and by inserting a locking piece 190 formed on the bottom edge of the second mounting member 14 into the mating groove 188 and locking it therein, the electromagnetic oscillator 168 is attached covering the bottom opening of the second mounting member 14.

The actuating rod 118 of this embodiment is inserted from above along the center axis of the electromagnetic oscillator 168 (the center axis of the slider 184) and passes through the annular mating projection 186 of the slider 184. A coil spring 192 is eternally fitted onto the actuating rod 118, straddling the interval between upper end of the slider 184 and the floor of the yoke portion 130 integrally formed at the distal end of the actuating rod 118. A positioning nut 194 is threaded onto a male screw thread formed on the lower distal end of the actuating rod 118. The positioning nut 194 is screwed onto the actuating rod 118 so as to compress the coil spring 192 against the yoke portion 130 via the mating projection 186, whereby the slider 184 is fixedly positioned in the axial direction with respect to the actuating rod 118. By coupling the actuating rod 118 and the slider 184 in the axial direction with urging force on the coil spring 192, actuating force acting on the slider 184 when current is supplied to the coil 90 is in turn exerted on the actuating rod 118.

The center of the bottom wall of the outer yoke 170 is perforated by an opening 198 which can be opened and closed by means of a lid member 196, and which leads into the center hole 200 of the slider 184. By inserting a tool such as a hex wrench through the opening 198 and into the center hole 200 of the slider 184, and turning the positioning nut 194 or a lock bolt 202 fastened in the center of the positioning nut 194, it is possible to adjust the position of the slider 184 with respect to the actuating rod 118. That is, by adjusting the distance by which the positioning nut 194 is threaded onto the actuating rod 118, the attachment location of the slider 184 can be modified appropriately, and in association therewith the distance between the magnetic force acting face of the yokes 172, 174 of the slider 184 can be adjusted.

A tiny gap is formed between the opposed faces of the slider 184 and the outer peripheral edge of the positioning nut 194, and the slider 184 is held in an abutting state superimposed against the positioning nut 194, in a state permitting a certain amount of sliding displacement in the axis-perpendicular direction with respect to the actuating rod 118. With this arrangement, relative misalignment of the actuating rod 118 and the slider 184 caused by dimensional error during production of the components or by positioning error during assembly is advantageously absorbed, so that the slider 184 can be positioned stably in the axis-perpendicular direction with respect to the coil 90. The permissible level of such relative displacement in the axis-perpendicular direction is preferably in the range of 0.2–0.3 mm, for example.

The attracted member 138 of this embodiment has a thick, generally disk shape, and the outside diameter dimension thereof is greater than the outside diameter dimension of the yoke portion 130 having the permanent magnet 132 disposed therein. An upwardly projecting caulking projection 204 is formed in the center of the attracted member 138. The attracted member 138 is then pressure fitted into the coupling member 28, passing the caulking projection 204 through the top floor of the coupling member 28 and into the fastening hole 82 in the center of the excitation plate 74; and the caulking projection 204 is then subjected to a caulking process.

A magnetic pole face of the permanent magnet 132 affixed to the distal end of the actuating rod 118 is superimposed against the lower end face of the attracted member 138. With this arrangement, the excitation plate 74 and the actuating rod 118 are coupled on the basis of attraction and fixation by the magnetic force of the permanent magnet 132 on the attracted member 138.

While the engine mount 150 of this construction is furnished with the oscillator 168 by way of electromagnetic actuating assembly differing in form from that in the first embodiment described previously, nevertheless, the excitation plate 74 and the actuating rod 118 are coupled on the basis of the magnetic force of the permanent magnet 132 analogously to the first embodiment, whereby they are advantageously coupled even in the event that axial misalignment should occur.

Since the excitation plate 74 is supported directly by the annular support rubber elastic body 160, there is a concern that if conventional coupling means such as bolt fastening or press member were used, if the excitation plate 74 and the actuating rod 118 were to be coupled under conditions in which axial misalignment has occurred, the support rubber elastic body 160 would be subjected to appreciable stress via the excitation plate 74.

Accordingly, in this embodiment, by means of fixing the permanent magnet 132 and the attracted member 138 consisting of ferromagnetic material, the excitation plate 74 and the actuating rod 118 may be coupled while held in a state of axial misalignment. As a result, stress bearing on the support rubber elastic body 160 is reduced, and durability is advantageously improved.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For example, the forms of the permanent magnet 132 and the attracted member 138 are not limited to those given by way of example herein; nor is the yoke portion 130 essential.

Figure 6:
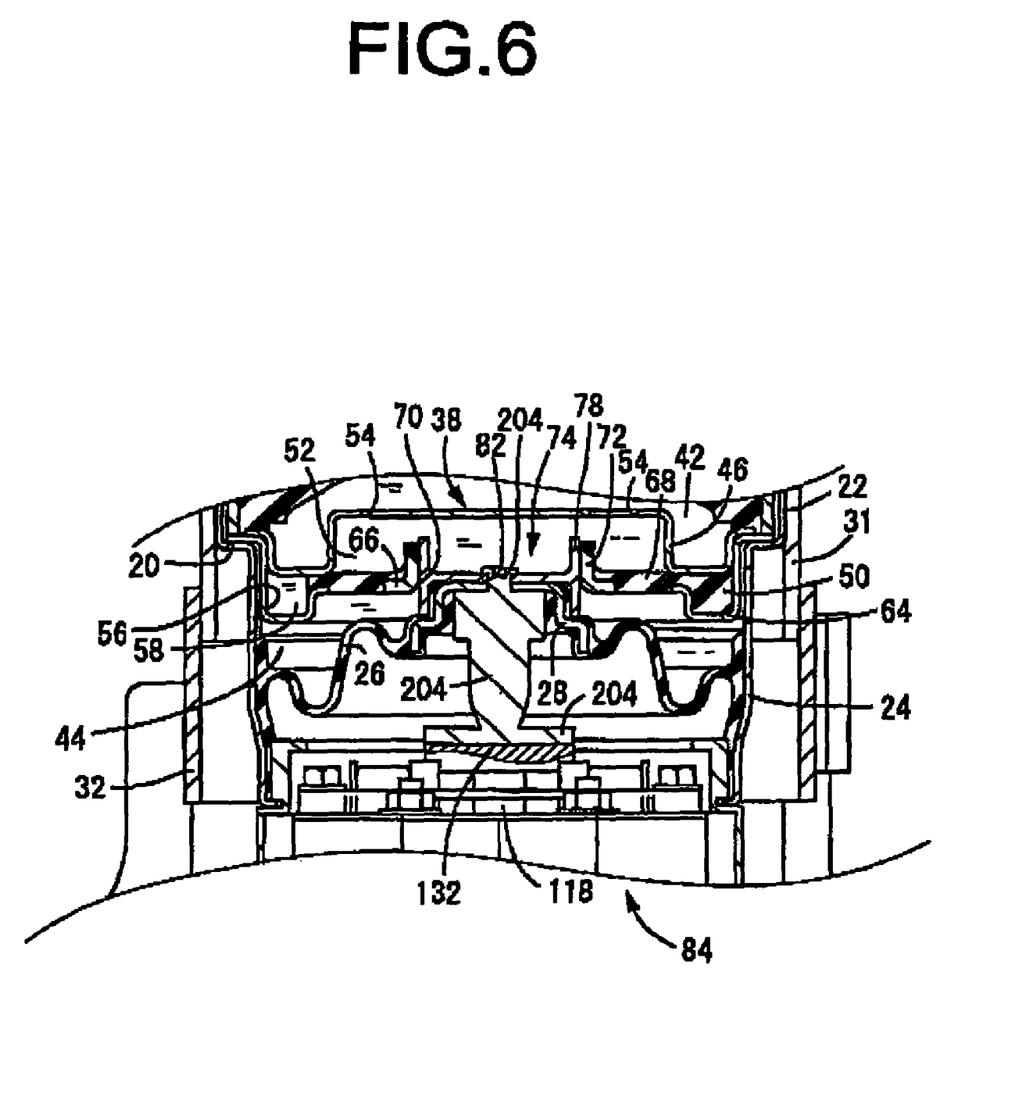
FIG. 6 is an elevational view in axial or vertical cross section of an automobile engine mount of construction according to a third embodiment of the invention.

Specifically, as shown in FIG. 6 for example, a permanent magnet 132 of disk shape magnetized in the axial direction could be affixed to the distal end of the actuating rod 118 so as to extend in the axis-perpendicular direction, and without disposing a yoke portion around the permanent magnet 132, the permanent magnet 132 may be superimposed against the attracted member 138 and fixed by attraction therewith. To aid in understanding, in this specific example, components and areas that are substantially identical in structure to those of the preceding embodiments have been assigned in FIG. 6 the same symbols as used in the preceding embodiments, and are not described in any detail.

Additionally, whereas in the preceding embodiments, the outside diameter dimension of the superimposed face (magnetic pole face) of the permanent magnet 132 against the attracted member 138 was made smaller than the outside diameter dimension of the superimposed face of the attracted member 138 (disk portion 140) against the permanent magnet 132, it would also be acceptable for the two superimposed faces to have the same outside diameter dimension as depicted in FIG. 6, or for the two superimposed faces to be disposed as locations corresponding to the corresponding magnetic poles. By so doing, there is achieved a centering function whereby by means of the action of magnetic force, the center axis of the permanent magnet 132 and the center axis of the attracted member 138 are superimposed without any misalignment in the direction orthogonal to the direction of juxtaposition.

Additionally, whereas in the preceding embodiments, the excitation plate 74 and the actuating rod 118 were coupled generally on the center axis of the mounting, depending on required production conditions and the like, they could be coupled at a location away from the center axis of the mounting.

Additionally, whereas the ferromagnetic member superimposed against the magnetic pole face of the permanent magnet 132 was constituted by the attracted member 138 composed of ferromagnetic material, the member is not limited thereto, it being possible to employ any member on which magnetic force (attractive force) may be exerted by the permanent magnet 132. Accordingly, the ferromagnetic member of this embodiment may consist of a permanent magnet, for example.

Additionally, whereas in the preceding embodiments one face of the permanent magnet 132 magnetized in the axial direction was superimposed as the magnetic pole face against the attracted member 138, it would be possible to instead dispose a yoke on the face of the permanent magnet facing the excitation plate side, having the outer peripheral face of the yoke on the excitation plate side constitute a magnetic pole face on the magnetic path, and to superimpose the attracted member 138 against the outer peripheral face of the yoke.

The shape, size, structure and number of the primary fluid chamber 42, secondary fluid chamber 52, equilibrium chamber 44, orifice passage 58 and so on are not limited to those given herein by way of example.

For example, in the first embodiment discussed previously, the orifice passage was formed by superimposing the orifice member 38 against the partition member 40; however, it would be acceptable to dispense with orifice member 38, instead forming a recessed groove that opens onto the outer peripheral face of the partition member 40 and extends a predetermined length, and covering the groove with the peripheral wall portion of the second mounting member 14. Additionally, since the orifice member 38 is not essential, it is not always necessary to furnish a secondary fluid chamber 52.

The specific construction and dimensions of the orifice passage 58 are not limited in any particular way, and may be tuned with reference to the required vibration damping characteristics. The orifice passage 58 need simply connect the pressure receiving chamber and the equilibrium chamber 44; where a pressure receiving chamber comprising a primary fluid chamber 42 and a secondary fluid chamber 52 as described by way of example is provided, the orifice passage may connect the equilibrium chamber with the primary fluid chamber, or connect the equilibrium chamber with the secondary fluid chamber.

Apart from the engine mount described herein by way of example, the invention is applicable generally to dynamic vibration damping apparatus; for example, it could be reduced to practice as a fluid filled active vibration damping apparatus in a tubular engine mount employed as an FF type automotive engine mount; or utilized similarly as a vibration damping connector or vibration damping support interposed between two members such as the power unit and body as described herein by way of example, or as a damper for mounting onto a vibrating target to be damped. Specifically, the fluid filled active vibration damping apparatus may be realized for example as a dynamic vibration damping apparatus, by fastening the second mounting member of the engine mount described in the preceding embodiments by means of a bracket to the vibrating target to be damped, while attaching a mass member of appropriate mass to a mounting plate portion provided to the first mounting member.

Additionally, the invention may be reduced to practice similarly in an automotive body mount or member mount; in mountings, dampers, and other vibration damping apparatus in various non-automotive apparatus; or in an actuator used in such a damping apparatus.

What is claimed is:

1. A fluid filled active vibration damping device comprising:
   a first mounting member;
   a second mounting member;
   a rubber elastic body elastically connecting the first and second mounting members;
   a pressure receiving chamber having a non-compressible fluid sealed therein and undergoing input of vibration, the pressure receiving chamber being defined at one part by the rubber elastic body, and at another part by an excitation plate capable of displacement;
   an electromagnetic actuating assembly disposed on an opposite side from the pressure receiving chamber with the excitation plate being located therebetween; and
   an output member;
   wherein:
   the excitation plate is subjected to actuating force of the output member actuated by application of electrical current to a coil member in the electromagnetic actuating assembly, thereby exciting the excitation plate in order to control a pressure in the pressure receiving chamber;
   the output member projects out towards the excitation plate from the electromagnetic actuating assembly, and a permanent magnet is disposed in at least one of the output member and the excitation plate, the permanent magnet generating an attractive magnetic force that couples the output member and the excitation plate; and
   the permanent magnet is disposed on one of the output member and the excitation plate, and a magnetic member comprising ferromagnetic material is disposed on an other of the output member and the excitation plate, while the output member and the excitation plate are coupled by means of superimposing a magnetic pole produced by the permanent magnet, against the ferromagnetic material.

2. A fluid filled active vibration damping device according to claim 1, wherein the output member and the excitation plate have respectively faces superimposed against each other and coupled utilizing magnetic force, each face being designed as a flat surface extending orthogonal to a direction of displacement of the output member.

3. A fluid filled active vibration damping device according to claim 2, wherein one of the flat surface of the output member or the flat surface of the excitation plate is constituted as a magnetic pole face at which is positioned a magnetic pole produced by the permanent magnet; and an other one of the flat surface of the output member and the flat surface of the excitation plate side is constituted as a magnetic force acting face composed of ferromagnetic material, the magnetic force acting face having a larger flat shape than the magnetic pole face.

4. A fluid filled active vibration damping device according to claim 1, further comprising: a variable volume equilibrium chamber partially defined by a flexible film and having the non-compressible fluid sealed therein; and an orifice passage formed to connect the equilibrium chamber to the pressure receiving chamber.

5. A fluid filled active vibration damping device according to claim 4, wherein the flexible film is fastened fluid tightly at an outer peripheral edge portion thereof to the second mounting member; and a coupling portion is disposed perforating fluid tightly through a center portion of the flexible film from the excitation plate and projecting towards the output member of the electromagnetic actuating assembly, and coupled with the output member.

6. A fluid filled active vibration damping device according to claim 1, wherein:
   a yoke member is disposed around the permanent magnet, and
   both of two magnetic poles of the permanent magnet are located at an interface where a surface of the output member contacts a surface of the excitation plate.

* * * * *